United States Patent [19]

Farah et al.

[11] Patent Number: 5,994,467
[45] Date of Patent: Nov. 30, 1999

[54] POLYCARBONATE BLEND COMPOSITIONS

[75] Inventors: Hani Farah, Sugar Land, Tex.; Frank M. Hofmeister, Mauldin, S.C.; Samuel A. Ogoe, Missouri City, Tex.; Nancy J. Schrock; Leo R. Novak, both of Lake Jackson, Tex.

[73] Assignee: The Dow Chemical Company, Midland, Mich.

[21] Appl. No.: 08/979,793

[22] Filed: Nov. 26, 1997

Related U.S. Application Data

[60] Provisional application No. 60/031,863, Nov. 27, 1996.

[51] Int. Cl.$^6$ ........................................................ C08L 67/02
[52] U.S. Cl. ............................ 525/166; 525/208; 525/240
[58] Field of Search .................................... 525/166, 208, 525/240

[56] References Cited

U.S. PATENT DOCUMENTS

| | | |
|---|---|---|
| 2,465,319 | 3/1949 | Whinfield et al. . |
| 3,047,539 | 7/1962 | Pengilly . |
| 3,645,992 | 2/1972 | Elston . |
| 3,756,986 | 9/1973 | Russell . |
| 4,496,693 | 1/1985 | Rosenquist et al. . |
| 4,701,432 | 10/1987 | Welborn, Jr. . |
| 4,798,081 | 1/1989 | Hazlitt et al. . |
| 4,840,995 | 6/1989 | Tamura et al. . |
| 4,889,898 | 12/1989 | Liang . |
| 4,935,397 | 6/1990 | Cheng . |
| 4,937,299 | 6/1990 | Ewen et al. . |
| 4,937,301 | 6/1990 | Cheng . |
| 5,055,438 | 10/1991 | Canich . |
| 5,272,236 | 12/1993 | Lai et al. . |
| 5,278,272 | 1/1994 | Lai et al. . |
| 5,416,148 | 5/1995 | Farah et al. . |

FOREIGN PATENT DOCUMENTS

| | | |
|---|---|---|
| 129368 | 12/1984 | European Pat. Off. . |
| 260999 | 3/1988 | European Pat. Off. . |
| 62 184 051 | 8/1987 | Japan . |
| 5-39415 | 2/1993 | Japan . |
| WO 90/07526 | 7/1990 | WIPO . |
| WO 94/06859 | 3/1994 | WIPO . |

OTHER PUBLICATIONS

Wild, Journal of Polymer Science, Polymer Physics Edition, vol. 20, p. 441 (1982).

*Primary Examiner*—Robert Dawson
*Assistant Examiner*—D. Aylward

[57] ABSTRACT

A polycarbonate blend composition with a good balance of high impact resistance, moldability, and controllable gloss with reduced tendencies of pearlescence or delamination in molded articles is prepared by admixing with polycarbonate a substantially linear ethylene polymer or linear ethylene polymer, an olefinic epoxide-containing copolymer, and a polyester.

13 Claims, No Drawings

POLYCARBONATE BLEND COMPOSITIONS

This application claims the benefit of U.S. provisional application No. 60/031,863 filed Nov. 27, 1996.

FIELD OF THE INVENTION

This invention relates to compositions containing a polycarbonate, a substantially linear ethylene polymer or a linear ethylene polymer, an olefinic epoxide-containing copolymer, and a polyester and to methods of preparation of such compositions. This invention relates particularly to compatibilised blends of a polycarbonate with a substantially linear ethylene polymer or a linear ethylene polymer. Said compositions, when molded, display a desirably high level of impact resistance and controllable gloss.

BACKGROUND OF THE INVENTION

Polycarbonate finds many uses because, in general, articles molded from polycarbonate demonstrate a high level of heat resistance and dimensional stability with good insulating and non-corrosive properties. However, molded polycarbonate articles exhibit decreasing impact resistance in the areas where the article is thicker. Additionally, polycarbonate can be difficult to mold and suffers from the inability to be molded into thinwall products. This disadvantage is somewhat relieved by decreasing the molecular weight of the polycarbonate to lower its viscosity. However, as a result, ductility is often reduced and there is an undesirable increase in gloss. Furthermore, impact resistance for articles molded from polycarbonate declines rapidly at low temperature. Consequently, it is difficult to obtain molded articles from polycarbonate with a good balance of impact resistance over a broad temperature range, heat resistance, dimensional stability, moldability, and controllable gloss.

Various olefin polymers can be blended with polycarbonate to lower the viscosity of the blend. However, blending a polycarbonate with an olefin polymer tends to cause the molded article to delaminate, which reduces impact resistance, toughness, and weldline strength, as reported, for example, in U.S. Pat. No. 4,496,693. This deficiency has been somewhat relieved by the selection of a substantially linear ethylene polymer or a linear ethylene polymer to blend with polycarbonate as disclosed in U.S. Pat. No. 5,416,148 and PCT Pat. No. WO 94/06859. Another resulting disadvantage of blending polycarbonate with various olefin polymers is the tendency to cause pearlesence, which is aesthetically unacceptable, especially in unpainted molded products.

There have been attempts to provide compatibilization in blends of these types. One such method has been graft modification of polyolefin polymers, such as low density, linear low density, or high density polyethylene and polypropylene, with various olefinically unsaturated monomers is well known in the art. Such a modification renders an essentially nonpolar polyolefin material compatible, at least to some limited extent, with polycarbonate. The practice of blending polycarbonate with polyolefin polymers grafted with one or more unsaturated organic compounds containing both ethylenic unsaturation and a carbonyl group, e.g., maleic anhydride and a polyester, is disclosed in U.S. Pat. Nos. 4,840,995 and 4,889,898. The practice of blending polycarbonate with (1) a polyolefin produced by a conventional coordination catalyst, such as a "Ziegler" type or "Philips" type; (2) an epoxide-containing copolymer; and (3) a polyester is discussed in Japanese Pat. Kokai No. H5-39415.

It would be desirable if modifiers blended with polycarbonate for the purpose of improving impact resistance would result in a good combination of heat resistance, dimensional stability, and weldline strength while not increasing the viscosity of the blend or causing delamination as evidenced by peeling or splintering in a molded article. These properties, coupled with controllable gloss and an acceptable "as molded" appearance, as evidenced by the absence of pearlescence, is desired to reduce the need for painting molded articles. Eliminating the need to paint would eliminate the environmental hazards related to painting. Additionally, eliminating painting will reduce the cost to manufacture high performance, aesthetically acceptable molded articles for automotive interior, durable appliances, and electrical applications.

SUMMARY OF THE INVENTION

It has been found that articles molded from a polycarbonate blended with a substantially linear ethylene polymer or a linear ethylene polymer, a compatibilizing amount of an olefinic epoxide-containing copolymer, and a polyester possess a good balance of high impact resistance, heat resistance, dimensional stability, moldability, controllable gloss, and weldline strength with reduced tendencies of pearlescence and delamination in the molded article.

In one aspect, this invention involves a polymer blend composition comprising, in admixture:
(a) a polycarbonate in an amount from about 40 to about 96 parts by weight;
(b) a substantially linear ethylene polymer or a linear ethylene polymer in an amount from about 1 to about 50 parts by weight, which has:
  (i) a density of less than about 0.93 g/cm$^3$,
  (ii) a molecular weight distribution, $M_w/M_n$, of less than about 3.0, and
  (iii) a Composition Distribution Branch Index of greater than 50 percent;
(c) an olefinic epoxide-containing copolymer in an amount from about 0.5 to about 10 parts by weight; and
(d) a polyester in an amount from about 0.5 to about 40 parts by weight; said parts by weight being based on 100 weight parts components (a), (b), (c), and (d).

It has been found that articles molded from the composition of this invention have reduced tendency towards delamination and exhibit a desirable balance of surprisingly high levels of impact resistance, heat resistance, dimensional stability, moldability, controllable gloss, and weldline strength with reduced tendencies of peariescence in the molded article.

This invention also involves a method of preparing a strengthened polycarbonate blend composition by blending a polycarbonate with a substantially linear ethylene polymer or a linear ethylene polymer, an olefinic epoxide-containing copolymer and a polyester. Further, this invention involves a method of molding a polycarbonate blend composition whereby polycarbonate which has been admixed with at least a substantially linear ethylene polymer or a linear ethylene polymer, an olefinic epoxide-containing copolymer and a polyester is molded.

The polycarbonate blend compositions of this invention are useful, for example, in the production of films, fibers, extruded sheets, multi-layer laminates and molded or shaped articles of virtually all varieties, especially appliance and instrument housings, motor vehicle body panels and other parts and components for use in interior and exterior automotive applications, data storage apparatus, and electrical and electronics applications.

DETAILED DESCRIPTION OF THE INVENTION

Component (a) in the polycarbonate blend compositions of this invention is a polycarbonate ("PC") polymer. The polycarbonates suitable for use in this invention are well known in the literature and can be prepared by known techniques. In general, the polycarbonates can be prepared from one or more multihydric compounds by reacting the multihydric compounds such as a diphenol, with a carbonate precursor such as phosgene, a haloformate or a carbonate ester such as diphenyl or dimethyl carbonate. Preferred diphenols are 2,2-bis(4-hydroxyphenyl)-propane and bishydroxyphenylfluorene. The polycarbonates can be prepared from these raw materials by any of several known processes such as the known interfacial, solution or melt processes. As is well known, suitable chain terminators and/or branching agents can be employed to obtain the desired molecular weights and branching degrees.

It is understood, of course, that the polycarbonate may be derived from (1) two or more different dihydric phenols or (2) a dihydric phenol and a glycol or a hydroxy- or acid-terminated polyester or a dibasic acid in the event a carbonate copolymer or heteropolymer rather than a homopolymer is desired. Also suitable for the practice of this invention are blends of one or more of the above polycarbonates. Also included in the term polycarbonate are the ester/carbonate copolymers.

The polycarbonate is employed in the polycarbonate blend compositions of the present invention in amounts sufficient to provide the desired balance of physical properties and impact resistance. In general the polycarbonate is employed in amounts of at least 40 parts by weight, preferably at least 55 parts by weight, more preferably at least 70 parts by weight, and most preferably at least 85 parts by weight of the total composition. In general the polycarbonate is used in amounts less than or equal to about 96 parts by weight, preferably about 94 parts by weight, more preferably about 92 parts by weight, and most preferably about 90 parts by weight by of the total composition.

Component (b) in the compositions of this invention is a substantially linear ethylene polymer or a linear ethylene polymer ("S/LEP"), or a mixture of more than one thereof. Both substantially linear ethylene polymers and linear ethylene polymers are known. Substantially linear ethylene polymers and their method of preparation are fully described in U.S. Pat. No. 5,272,236 and U.S. Pat. No. 5,278,272, both of which are incorporated herein by reference. Linear ethylene polymers and their method of preparation are fully disclosed in U.S. Pat. Nos. 3,645,992; 4,937,299; 4,701,432; 4,937,301; 4,935,397; and 5,055,438; E.P. Pat. Nos. 129,368 and 260,999, and P.C.T. Pat. No. WO 90/07526, each of which is incorporated herein by reference.

As used here, "a linear ethylene polymer" means a homopolymer of ethylene or a copolymer of ethylene and one or more α-olefin comonomers having a linear backbone (i.e. no cross linking), no long-chain branching, a narrow molecular weight distribution and for α-olefin copolymers, a narrow composition distribution. Further, as used here, "a substantially linear ethylene polymer" means a homopolymer of ethylene or a copolymer of ethylene and of one or more α-olefin comonomers having a linear backbone, a specific and limited amount of long-chain branching, a narrow molecular weight distribution and for α-olefin copolymers, a narrow composition distribution.

Short-chain branches in a linear polymer arise from the pendent alkyl group resulting upon polymerization of intentionally added $C_3$–$C_{20}$ α-olefin comonomers.

Narrow composition distribution is also sometimes referred to as homogeneous short-chain branching. Narrow composition distribution and homogeneous short-chain branching refer to the fact that the α-olefin comonomer is randomly distributed within a given copolymer of ethylene and an α-olefin comonomer and virtually all of the copolymer molecules have the same ethylene to comonomer ratio. The narrowness of the composition distribution is indicated by the value of the Composition Distribution Branch Index (CDBI) or sometimes referred to as Short Chain Branch Distribution Index. CDBI is defined as the weight percent of the polymer molecules having a comonomer content within 50 percent of the median molar comonomer content. The CDBI is readily calculated, for example, by employing temperature rising elution fractionation, as describes in Wild, *Journal of Polymer Science*, Polymer Physics Edition, Volume 20, page 441 (1982), or U.S. Pat. No. 4,798,081, each being incorporated herein by reference. The CDBI for the substantially linear ethylene polymers and the linear ethylene polymers in the present invention is greater than about 30 percent, preferably greater than about 50 percent, and more preferably greater than about 90 percent.

Long-chain branches in substantially linear ethylene polymers are polymer branches other than short chain branches. Typically, long chain branches are formed insitu generation of an oligomeric α-olefin via β-hydride elimination in a growing polymer chain. The resulting species is a relatively high molecular weight vinyl terminated hydrocarbon which upon polymerization yields the large pendent alkyl group. Long-chain branching may be further defined as hydrocarbon branches to a polymer backbone having a chain length greater than n-2 carbons, where n is the number of carbons of the largest α-olefin comonomer intentionally added to the reactor. Preferred long-chain branches in homopolymers of ethylene or copolymers of ethylene and one or more $C_3$–$C_{20}$ α-olefin comonomers have at least from 20 carbons up to more preferably the number of carbons in the polymer backbone. Long-chain branching may be distinguished using $^{13}C$ nuclear magnetic resonance spectroscopy alone, or with GPC-LALS (gel permeation chromatography-laser light scattering) or a similar analytical technique. Substantially linear ethylene polymers contain at least 0.01 long-chain branches/1000 carbons and preferably 0.05 long-chain branches/1000 carbons. In general, substantially linear ethylene polymers contain less than or equal to 3 long-chain branches/1000 carbons and preferably less than or equal to 1 long-chain branch/1000 carbons.

Preferred substantially linear ethylene polymers are prepared by using metallocene based catalysts capable of readily polymerizing high molecular weight α-olefin copolymers under the process conditions. As used here, copolymer means a polymer of two or more intentionally added comonomers, for example, such as might be prepared by polymerizing ethylene with at least one other $C_3$ –$C_{20}$ comonomer. Linear ethylene polymers may be prepared in a similar manner using metallocene or vanadium based catalyst under conditions that do not permit polymerization of monomers other than those intentionally added to the reactor. Other basic characteristics of substantially linear ethylene polymers or linear ethylene polymers include a low residuals content (i.e. a low concentration therein of the catalyst used to prepare the polymer, unreacted comonomers and low molecular weight oligomers made during the course of the polymerization), and a controlled molecular architecture which provides good processability even though the molecular weight distribution is narrow relative to conventional olefin polymers.

While the substantially linear ethylene polymers or the linear ethylene polymers used in the practice of this invention include substantially linear ethylene homopolymers or linear ethylene homopolymers, preferably the substantially linear ethylene polymers or the linear ethylene polymers comprise between about 50 to about 95 weight percent ethylene and about 5 to about 50, and preferably about 10 to about 25 weight percent of at least one α-olefin comonomer. The comonomer content in the substantially linear ethylene polymers or the linear ethylene polymers is generally calculated based on the amount added to the reactor and as can be measured using infrared spectroscopy according to ASTM D-2238, Method B. Typically, the substantially linear ethylene polymers or the linear ethylene polymers are copolymers of ethylene and one or more $C_3$–$C_{20}$ α-olefins, preferably copolymers of ethylene and one or more $C_3$–$C_{10}$, α-olefin comonomers and more preferably copolymers of ethylene and one or more comonomers selected from the group consisting of propylene, 1-butene, 1-hexene, 4-methyl-1-pentane, and 1-octene. Most preferably copolymers are ethylene/1-octene copolymers.

The density of these substantially linear ethylene polymers or linear ethylene polymers is equal to or greater than 0.850 grams per cubic centimeter (g/cm$^3$) and preferably equal to or greater than 0.860 g/cm$^3$. Generally, the density of these substantially linear ethylene polymers or linear ethylene polymers is less than or equal to 0.935 g/cm$^3$ and preferably less than or equal to 0.900 g/cm$^3$. The melt flow ratio for substantially linear ethylene polymers, measured as $I_{10}/I_2$, is greater than or equal to about 5.63, is preferably from about 6.5 to about 15, and is more preferably from about 7 to about 10. $I_2$ is measured according to ASTM Designation D 1238, Condition 190/2.16. $I_{10}$ is measured according to ASTM Designation D 1238, Condition 190/10.0.

The molecular weight distribution for substantially linear ethylene polymers is the weight average molecular weight divided by number average molecular weight ($M_w/M_n$). $M_w$ and $M_n$ are measured by gel permeation chromatography (GPC). For substantially linear ethylene polymers, the $I_{10}/I_2$ ratio indicates the degree of long-chain branching, i.e. the larger the $I_{10}/I_2$ ratio, the more long-chain branching exists in the polymer. In preferred substantially linear ethylene polymers $M_w/M_n$ is related to $I_{10}/I_2$ by the equation: $M_w/M_n \leq (<(I_{10}/I_2)-4.63$ and is at least 1.5 and preferably at least 2.0. Generally, $M_w/M_n$ for substantially linear ethylene polymers is less than or equal to 3.5, more preferably less than or equal to 3.0. In a most preferred embodiment, substantially linear ethylene polymers are also characterized by a single differential scanning calorimetry (DSC) melting peak.

The preferred $I_2$ melt index for these substantially linear ethylene polymers or linear ethylene polymers is from about 0.01 g/10 min to about 100 g/10 min, and more preferably about 0.1 to about 10 g/10 min.

The substantially linear ethylene polymer or linear ethylene polymer is employed in the blends of the present invention in amounts sufficient to provide the desired balance of processability and impact resistance. In general the substantially linear ethylene polymer or linear ethylene polymer is employed in amounts of at least 1 parts by weight, preferably at least 3 parts by weight, more preferably at least 5 parts by weight, and most preferably at least 7 parts by weight of the total composition. In general, the substantially linear ethylene polymer or linear ethylene polymer is used in amounts less than or equal to about 50 parts by weight, preferably about 40 parts by weight, more preferably about 35 parts by weight, and most preferably about 30 parts by weight of the total composition.

Component (c), the olefinic epoxide-containing copolymer used in this invention, is preferably a thermoplastic polymer and more preferably has a glass transition temperature ($T_g$) less than 0° C. $T_g$ is the temperature or temperature range at which a polymeric material shows an abrupt change in its physical properties, including, for example, mechanical strength. $T_g$ can be determined by differential scanning calorimetry.

The expoxide-containing copolymer of this invention is at least one copolymer formed from and comprising in polymerized form (i) one or more ethylenically unsaturated monomers not carrying an epoxide group, and (ii) at least one ethylenically unsaturated monomer carrying at least one epoxide group.

In general, all compounds which contain both a polymerizable unsaturated group and a reactive epoxide group in the molecule can be used for component (ii) in the manufacture of the epoxide-containing copolymer of the invention. Ethylenically unsaturated monomers carrying epoxide groups suitable for use as component (ii) of the olefinic epoxide-containing copolymer include, for example, glycidyl esters of unsaturated carboxylic acids such as glycidyl methacrylate; glycidyl ethers of unsaturated alcohols such as allyl-glycidyl-ether and of alkenylphenols such as isopropenylphenyl-glycidylether; and vinyl and allyl esters of epoxycarboxylic acids such as vinyl esters of epoxidized oleic acid.

Representative ethylenically unsaturated monomers not carrying an epoxide group useful in forming the olefinic epoxide-containing copolymer of this invention include one or more of the following: alkenes, preferably $C_2$ to $C_{20}$, more preferably $C_2$ to $C_8$, and most preferably $C_2$ to $C_6$ straight or branched chain alkenes or alkadienes such as ethylene, propylene, butylene, octene, isopropylene, isobutylene, or conjugated dienes such as butadiene; $C_1$ to $C_8$ alkyl acrylates such as methyl acrylate, ethyl acrylate, butyl acrylate, hexyl acrylate or hydroxy ethyl acrylate; $C_1$ to $C_8$ alkyl methacrylates such as methyl methacrylate or hexyl methacrylate; other esters of the $C_1$ to $C_6$ aliphatic or cycloaliphatic alcohols such as the esters of $C_1$ to $C_4$ aliphatic or cycloaliphatic alcohols and acrylic or methyacrylic acid; olefinically unsaturated esters of carboxylic acids such as, vinyl acetate, vinyl propionate and vinyl benzoate; vinyl and vinylidene aromatic compounds such as styrene, vinyl toluene, and α-methyl styrene, optionally said vinyl and vinylidene aromatic compounds may bear a polar, electronegative group or functionality such as a halogen group, or an organic group having a double or triple bond such as phenyl, carboxy, cyano or the like; or vinyl halide compounds and vinylidene halide compounds such as vinyl chloride, vinylidene chloride, and the like; or vinyl and vinylidene ethers, vinyl-methyl-ether, vinyl-ethyl-ether and vinyl-isobutyl-ether; or a mixture of two or more of any of the foregoing.

The olefinic epoxide-containing copolymer is formed by polymerization through the double bond of an ethylenically unsaturated monomer (i) and one or more ethylenically unsaturated monomers carrying at least one epoxide group (ii). The epoxide groups are pendant from a sub-component (ii) and after polymerization are free to react. Sub-components (i) and (ii) together form a generally linear polymer, and additional ethylenically unsaturated monomers may be optionally grafted as a homo- or copolymeric branch onto the generally linear chain prepared from sub-components (i) and (ii).

Generally, the ethylenically unsaturated monomer carrying at least one epoxide group (ii) is less than or equal to 25 parts by weight, preferably less than or equal to 15 parts by weight, more preferably less than or equal to 10 parts by weight, and most preferably less than or equal to 8 parts by weight of the olefinic epoxide-containing copolymer. The ethylenically unsaturated monomer carrying at least one epoxide group (ii) constitutes at least 0.5 parts by weight, preferably at least 2 parts by weight, and more preferably at least 3 parts by weight of the olefinic epoxide-containing copolymer. The ethylenically unsaturated monomers (i) constitutes the balance, generally from about 99.5 to about 75 parts by of the olefinic epoxide-containing copolymer. Olefinic epoxide-containing copolymers of about 40 to about 95 percent (by weight) of an alkene, preferably ethylene, about 1 to about 25 percent of glycidyl methacrylate, and, optionally from about 1 to about 40 percent of another ethylenically unsaturated monomer other than an alkene, preferably methyl acrylate, methyl methacrylate, vinyl acetate or butyl acrylate are particularly suitable for use herein as the olefinic epoxide-containing copolymer. Olefinic epoxide-containing copolymers comprising from about 1 to about 25 percent of glycidyl methacrylate, more preferably from about 1 to 10 percent, with the balance made up of ethylene are more preferred. The molecular weight of the olefinic epoxide-containing copolymer is preferably between about 10,000 and about 500,000, preferably between about 30,000 and about 200,000.

The olefinic epoxide-containing copolymer is employed in the polycarbonate blend compositions of the present invention in amounts sufficient to provide the desired balance of low gloss, low pearlescense, weldline strength, impact and reduced tendency for delamination. In general, the olefinic epoxide-containing copolymer is employed in amounts of at least 0.5 parts by weight, preferably at least 1 part by weight, more preferably at least 1.5 parts by weight, and most preferably at least 2 parts by weight of the total composition. In general, the olefinic epoxide-containing copolymer is used in amounts less than or equal to about 10 parts by weight, preferably about 7 parts by weight, more preferably about 6 parts by weight, and most preferably about 5 parts by weight of the total composition.

The polyesters, component (d), which can be used in this invention are known and are commercially available, and may be made by a variety of methods. Examples of such polyesters which are suitable as (d) include poly(alkylene alkanediarboxylate), a poly(alkylene phenylenedicarboxylate), a poly(phenyl alkanedicarboxylate), or a poly(phenylene phenylenedicarboxylate) is therefore appropriate for use herein. Methods and materials useful for the production of polyesters are discussed in greater detail in Whinfield, U.S. Pat. No. 2,465,319, Pengilly, U.S. Pat. No. 3,047,539 and Russell, U.S. Pat. No. 3,756,986, each of which is incorporated herein in its entirety. Aromatic polyesters such as the poly(alkylene phenylene-dicarboxylates), which include polyethylene terephthalate and polybutylene terephthalate, or mixtures thereof, are particularly useful in this invention. These aromatic polyesters typically have an intrinsic viscosity between about 0.35 and about 1.2, preferably about 0.35 and 1.1, and are more easily processed than aromatic polyesters with higher intrinsic viscosities.

The polyester is employed in the polycarbonate blend compositions of the present invention in amounts sufficient to provide the desired balance of physical properties and impact resistance. In general, the polyester is employed in amounts of at least 0.5 parts by weight, preferably at least 1 part by weight, more preferably at least 1.5 parts by weight, even more preferably at least 2 parts by weight, and most preferably at least 5 parts by weight of the total composition. In general, the polyester is used in amounts less than or equal to about 40 parts by weight, preferably about 30 parts by weight, more preferably about 20 parts by weight, even more preferably about 10 parts by weight, and most preferably about 7 parts by weight of the total composition.

The claimed polycarbonate blend compositions may also optionally contain a component (e) which is one or more additives that are commonly used in polycarbonate blend compositions of this type. Preferred additives of this type include, but are not limited to: impact modifiers, fillers, reinforcements, ignition resistant additives, stabilizers, colorants, flow enhancers, antioxidants, antistats, etc. Preferred examples of additives are impact modifiers such as, but not limited to core-shell graft copolymers or fillers, such as, but not limited to talc, clay, mica, glass or a mixture thereof. Additionally, ignition resistance additives, such as, but not limited to halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Further, compounds which stabilize polycarbonate blend compositions against degradation due to causes such as, but not limited to heat, light, and oxygen, or a mixture thereof may be used. If used, such additives may be present in an amount from about 0.01 to about 25 parts by weight, preferably about 1 to about 15 parts by weight, and more preferably from about 1 to about 10 parts by weight based on weight of components (a), (b), (c), (d), and (e) in the composition.

Also included within this invention are the reaction products, if any, of the above named components when admixed in the polycarbonate blend compositions of this invention.

Preparation of the polycarbonate blend compositions of this invention can be accomplished by any suitable mixing means known in the art. The polycarbonate blend compositions of this invention can be produced by sequential compounding steps in a multi-step compounding process. In one such multi-step process, the substantially linear ethylene polymer or linear ethylene polymer, olefinic epoxide-containing copolymer and polyester to be combined with the polycarbonate are dry blended in particulate form with sufficient agitation to obtain thorough distribution thereof. A Henschel mixer or a ribbon blender may be used for dry blending. The dry blended mixture is then melt blended in an extruder to form a compatabilized substantially linear ethylene polymer or compatabilized linear ethylene polymer formulation. Mixing rolls, a Banbury mixer, or extruder can be used for melt blending. The resulting compatabilized substantially linear ethylene polymer or compatabilized linear ethylene polymer formulation can then be dry or melt blended with the polycarbonate, and any other additives or fillers, and then extruded or molded into a shaped article.

Alternatively, and preferably, (a) the polycarbonate, (b) the substantially linear ethylene polymer or the linear ethylene polymer, (c) the olefinic epoxide-containing copolymer, (d) the polyester, and all (e) other additives to be mixed with the blend are dry blended in particulate form with sufficient agitation to obtain thorough distribution thereof in the polycarbonate and then extruded or molded into a shaped article. Most preferably, a polycarbonate, a substantially linear ethylene polymer or a linear ethylene polymer, an olefinic epoxide-containing copolymer, a polyester, and all other substances to be mixed with polycarbonate are collectively and/or separately metered in appropriate amounts into an extruder or reciprocating screw injection molding machine and then extruded or molded into a shaped article.

When softened or melted by the application of heat, the polycarbonate blend compositions of this invention can be formed or molded using conventional techniques such as compression molding, injection molding, gas assisted injection molding, calendering, vacuum forming, thermoforming, extrusion and/or blow molding, alone or in combination. The polycarbonate blend compositions can also be formed, spun, or drawn into films, fibers, multi-layer laminates or extruded sheets, or can be compounded with one or more organic or inorganic substances, on any machine suitable for such purpose.

To illustrate the practice of this invention, examples of preferred embodiments are set forth below. However, these examples do not in any manner restrict the scope of this invention. Some of the particularly desirable features of this invention may be seen by contrasting the characteristics of Example 1 and 2 with those of various control formulations (Controls A–C) which do not possess the features of, and are not therefore embodiments of this invention.

The compositions of Examples 1 and 2 and Controls A–C are prepared by mixing the dry components in a paint mixer for 5 minutes, and then feeding the dry-blended formulation to a 30 mm Werner and Pfleider extruder. The following were the compounding conditions on the Werner and Pfleider extruder: Barrel temperature profile: 150, 280, 280, 280, and 280° C.; RPM: 257; Die pressure: 60 bar; Torque: 55%; Feed: 40 pound per hour; and Melt temperature: 293° C. The extrudate is cooled in the form of strands and comminuted as pellets. The pellets are dried in an air draft oven for 3 hours at 120° C., and then are used to prepare test specimens on a 70 ton Arburg injection molding machine, having the following molding conditions: Barrel temperature of 290° C.; Mold temperature of 85° C.; Injection pressure: 40 bar; Holding pressure: 35 bar; Back pressure: 5 bar; and Screw speed: 3.8.

The compositions of Examples 3–11 are prepared by mixing the dry components in a paint mixer for 5 minutes, and then feeding the dry-blended formulation to a 30 mm Werner and Pfleider extruder. The following were the compounding conditions on the Werner and Pfleider extruder: Barrel temperature profile: 200, 250, 260, 275, and 270° C.; RPM: 220; and Torque: 90. The extrudate is cooled in the form of strands and comminuted as pellets. The pellets are dried in an air draft oven for 3 hours at 120° C., and then are used to prepare test specimens on a 70 ton Arburg injection molding machine, having the following molding conditions: Barrel temperature of 280° C.; Injection pressure: 70 bar; Holding pressure: 25 bar; Back pressure: 20 bar; Injection time: 0.1 seconds; Holding time: 6.0 seconds; and Cooling time: 16.0 seconds.

The formulation content and properties of Examples 1 and 2 and Controls A–C are given in Table 1 below in parts by weight of the total composition. The formulation content and properties of Examples 3–11 are given in Table 2 below in parts by weight of the total composition. In Tables 1 and 2

"PC 1" is a Bisphenol-A polycarbonate having a weight average molecular weight of about 24,000;

"PC 2" is a Bisphenol-A polycarbonate having a weight average molecular weight of about 27,000;

"E/GMA 1" is an ethylene/glycidyl methacrylate copolymer with 12 weight percent glycidyl methacrylate (IGETABOND™ -E from Sumitomo Chemical America);

"E/GMA 2" is an ethylene/glycidyl methacrylate copolymer with 8 weight percent glycidyl methacrylate (Lotader™ 8840 from Elf Atochem);

"S/LEP 1" is a substantially linear ethylene/octene copolymer, as described above as component (b), having a density of approximately 0.87 g/cm$^3$, 5 melt index, a molecular weight distribution of 2.0, and a CBDI of greater than 50 (Engage™ SM 8200 from DuPont/Dow Elastomers);

"S/LEP 2 is a substantially linear ethylene/octene copolymer, as described above as component (b), having a density of approximately 0.868 g/cm$^3$, 13 melt index, a molecular weight distribution of 2.0, and a CBDI of greater than 50 (Engage™ MG 8300 from DuPont/Dow Elastomers);

"S/LEP 3 is a substantially linear ethylene/octene copolymer, as described above as component (b), having a density of approximately 0.865 g/cm$^3$, 14 melt index, and a CBDI of greater than 50 (from DuPont/Dow Elastomers);

"S/LEP 4 is a substantially linear ethylene/octene copolymer, as described above as component (b), having a density of approximately 0.863 g/cm$^3$, 14 melt index, a molecular weight distribution of 2.0, and a CBDI of greater than 50 (Engage™ SM 8130 from DuPont/Dow Elastomers);

"PET" is crystalline polyethylene terephthalate having 0.59 inherent viscosity, measured in accordance with ASTM D 4603-86 (Traytuf™ 5900C from Shell Chemical Company); and "Carbon black" is a 20% carbon black concentration in polycarbonate.

The following tests were run on Examples 1 and 2 and Controls A–C, and the results of these test are also shown in Table 1:

Impact resistance as measured by the Izod test ("Izod") according to ASTM D 256–84 (Method A) at −30° C. The notch is 10 mils (0.254 mm) in radius.

Gloss was measured using a Dr. Lange Hunter lab gloss meter at a 60 degree angle.

Pearlescence is the appearance of a pearly, lustrous effect resulting from the simultaneous reflection of light from multiple micro-thin polymer layers. The effect is visually determined as existing or not.

It can be seen from these test results that, when an olefinic epoxide-containing copolymer is added to a blend of polycarbonate, polyester, and a substantially linear ethylene polymer, the resulting composition displays, when molded, a desirable balance of impact properties, thermal properties, and reduced gloss, with no pearlescence. The data in Table 1 demonstrates that while polycarbonate has high impact strength in certain aspects, addition of a substantially linear ethylene polymer alone (Control C) or with a polyester polymer (Control B) results in sacrificing impact strength, causes pearlescence and results in no significant positive effect in lowering gloss. Control A demonstrates that while the addition of an olefinic epoxy-containing copolymer and a substantially linear ethylene polymer maintains impact strength it also results in a high gloss and pearlescence.

TABLE 1

Contents[1] and Properties of Controls A–C and Examples 1 and 2

|  | Control A | Control B | Control C | Example 1 | Example 2 |
|---|---|---|---|---|---|
| MATERIAL | | | | | |
| PC 1 | 90 | 87 | 92 | 85 | 85 |
| E/GMA 1 | 2 | 0 | 0 | 2 | 0 |
| E/GMA 2 | 0 | 0 | 0 | 0 | 2 |
| S/LEP 1 | 7 | 7 | 7 | 7 | 7 |
| PET | 0 | 5 | 0 | 5 | 5 |
| Carbon black | 1 | 1 | 1 | 1 | 1 |
| PROPERTY | | | | | |
| Gloss at 60° | 95 | 86 | 99 | 42 | 45 |
| Pearlescence | Yes | Yes | Yes | No | No |
| −30° C. Izod | 7.0 | 7.0 | 7.2 | 9.6 | 9.8 |

[1]compositions are in weight parts

The data in Table 2 demonstrates when an olefinic epoxide-containing copolymer is added to a blend of polycarbonate, polyester, and a substantially linear ethylene polymer, the resulting composition displays, when molded, good low temperature impact. Further, decreasing levels of polyester result in increasing heat resistance.

TABLE 2

Contents[1] and Properties of Examples 3–11

|  | 3 | 4 | 5 | 6 | 7 | 8 | 9 | 10 | 11 |
|---|---|---|---|---|---|---|---|---|---|
| MATERIAL | | | | | | | | | |
| PC 2 | 90 | 88 | 86 | 90 | 88 | 86 | 90 | 88 | 86 |
| PET | 2 | 4 | 6 | 2 | 4 | 6 | 2 | 4 | 6 |
| E/GMA 1 | 2 | 2 | 2 | 2 | 2 | 2 | 2 | 2 | 2 |
| S/LEP 2 | 6 | 6 | 6 | | | | | | |
| S/LEP 3 | | | | 6 | 6 | 6 | | | |
| S/LEP 4 | | | | | | | 6 | 6 | 6 |
| PROPERTIES | | | | | | | | | |
| Molded PC Mw (g/mole) | 26,783 | 27,009 | 26,878 | 27,366 | 26,821 | 26,905 | 26,975 | 26,675 | 26,609 |
| Molded PC Mn (g/mole) | 11,136 | 10,808 | 10,462 | 11,294 | 10,679 | 10,448 | 10,772 | 10,359 | 9,946 |
| Mw/Mn | 2.41 | 2.5 | 2.57 | 2.42 | 2.51 | 2.58 | 2.50 | 2.58 | 2.68 |
| Izod, at −30° C. (ft-lb/in) | 12.4 | 8.66 | 9.2 | 8.78 | 7.74 | 8.39 | 12.44 | 10.96 | 12.43 |
| HDUL, °C. | 141.2 | 140.4 | 140.5 | 141.6 | 141.2 | 139.3 | 140.8 | 140.8 | 139.4 |

[1]compositions are in weight parts

It is within the skill in the art to practice this invention in numerous modifications and variations in light of the above teachings. It is, therefore, to be understood that the various embodiments of this invention described herein may be altered without departing from the spirit and scope of this invention as defined by the appended claims.

What is claimed is:

1. A polymer blend composition comprising, in admixture:
   (a) a polycarbonate in an amount from about 40 to about 96 parts by weight;
   (b) a substantially linear ethylene polymer or a linear ethylene polymer in an amount from about 1 to about 50 parts by weight, which has:
      (i) a density of less than about 0.93 g/cm$^3$,
      (ii) a molecular weight distribution, $M_w/M_n$, of less than about 3.0 and
      (iii) a Composition Distribution Branch Index of greater than 50 percent;
   (c) an olefinic epoxide-containing copolymer in an amount from about 0.5 to about 10 parts by weight; and
   (d) a polyester in an amount from about 0.5 to about 7 parts by weight;
   said parts by weight being based on 100 weight parts components (a), (b), (c), and (d).

2. A polymer blend composition according to claim 1 wherein the substantially linear ethylene polymer or linear ethylene polymer is a copolymer of ethylene with a $C_3$ to $C_{20}$ alpha-olefin.

3. A polymer blend composition according to claim 1 wherein the substantially linear ethylene polymer or linear ethylene polymer is a copolymer of ethylene with propylene, 1-butene, 1-hexene, 4-methyl-1-pentane, and 1-octene.

4. A polymer blend composition according to claim 1 wherein the substantially linear ethylene polymer or linear ethylene polymer is a copolymer of ethylene and 1-octene.

5. A polymer blend composition according to claim 1 wherein the olefinic epoxide-containing copolymer is prepared from one or more ethylenically unsaturated comonomers not carrying an epoxide group and at least one ethylenically unsaturated monomer carrying an epoxide group.

6. A polymer blend composition according to claim 5 wherein the ethylenically unsaturated monomer carrying an epoxide group is a glycidyl ester of an unsaturated carboxylic acid.

7. A polymer blend composition according to claim 5 wherein the ethylenically unsaturated monomer carrying an epoxide group is glycidyl methacrylate.

8. A polymer blend composition according to claim 5 wherein the olefinic epoxide-containing copolymer is an ethylene and glycidyl methacrylate copolymer.

9. A polymer blend composition according to claim 5 wherein the olefinic epoxide-containing copolymer is an ethylene, glycidyl methacrylate, and methacrylate copolymer.

10. A polymer blend composition according to claim 1 further comprising a filler.

11. A polymer blend composition according to claim 10 wherein the filler is talc, clay, mica, glass or a mixture thereof.

12. A polymer blend composition according to claim 1 further comprising one or more ignition resistance additives selected from halogenated hydrocarbons, halogenated carbonate oligomers, halogenated diglycidyl ethers, organophosphorous compounds, fluorinated olefins, antimony oxide and metal salts of aromatic sulfur compounds.

13. A polymer blend composition according to claim 1 in the form of a molded or extruded article.

* * * * *